United States Patent [19]

Golz

[11] Patent Number: 4,615,958
[45] Date of Patent: Oct. 7, 1986

[54] MULTICELL BATTERY USING CONTINUOUS MANUFACTURE

[75] Inventor: Hans-Joachim Golz, Hanover, Fed. Rep. of Germany

[73] Assignee: Varta Batterie Aktiengesellschaft, Hanover, Fed. Rep. of Germany

[21] Appl. No.: 507,953

[22] Filed: Jun. 24, 1983

Related U.S. Application Data

[63] Continuation of Ser. No. 230,543, Feb. 2, 1981, abandoned, which is a continuation-in-part of Ser. No. 931,162, Aug. 4, 1978, abandoned.

[30] Foreign Application Priority Data

Aug. 23, 1977 [DE] Fed. Rep. of Germany ....... 2737838

[51] Int. Cl.⁴ .......................................... H01M 10/04
[52] U.S. Cl. .................................. 429/127; 429/160; 429/163; 429/178; 429/225
[58] Field of Search ................. 429/94, 127, 160, 163, 429/225, 178

[56] References Cited

U.S. PATENT DOCUMENTS 3,650,833 3/1972 Sundberg et al. ............. 429/209 X
4,051,304 2/1976 Snook ................................... 429/94

Primary Examiner—Anthony Skapars
Attorney, Agent, or Firm—Weiser & Stapler

[57] ABSTRACT

The electrode stacks, formed of zig-zag packages of strip electrodes with interposed separator, are inserted through side openings into the cells, and the block casing is closed by welding on a side wall.

10 Claims, 1 Drawing Figure

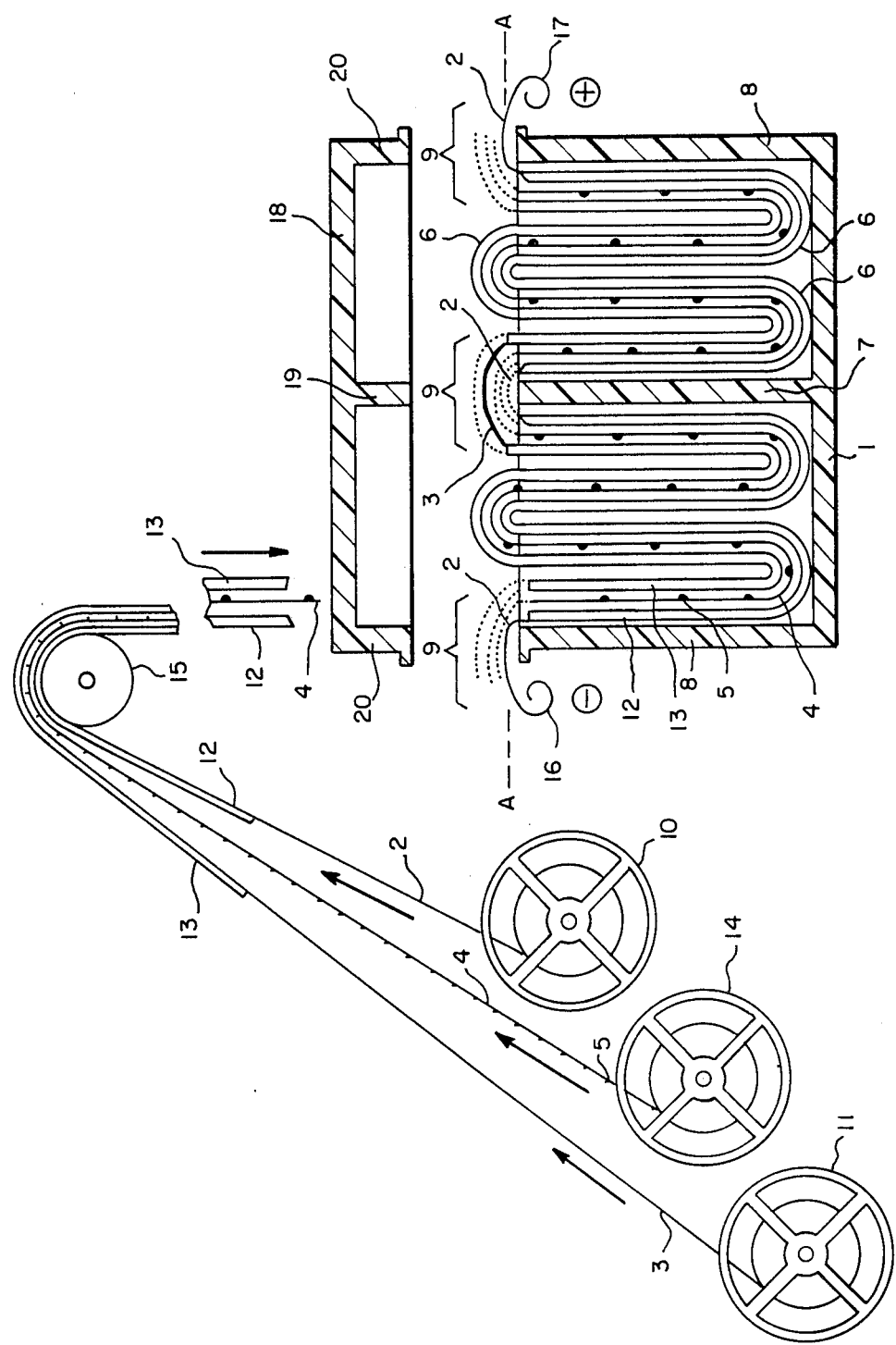

MULTICELL BATTERY USING CONTINUOUS MANUFACTURE

This application is a continuation, of application Ser. No. 230,543, filed Feb. 2, 1981, now abandoned, which in turn is a continuation-in-part of application Ser. No. 931,162, filed Aug. 4, 1978 now abandoned.

The invention relates to a multicell lead storage battery with plate stacks of positive and negative electrodes positioned within a block casing. In particular, the invention relates to a storage battery destined for vehicular use, e.g. a starter battery.

Regardless of its particular forms, which are adapted to the most varied applications, the lead storage battery has currently reached a peak of technological development. Classified in accordance with the construction of the positive plates, three basic types of storage battery cells can be distinguished. There are cells with positive large-surface plates, primarily for stationary applications, cells with positive grid plates which are suitable both for electric traction and for stationary applications.

For obvious reasons, lead storage batteries for use as vehicular batteries are built more compactly and lighter than stationary batteries. This applies particularly for the vehicle starter batteries, in which several cells are always united within a block casing of hard rubber or synthetic plastic. The block casings have welded-on lids, with an opening above each cell for the escape of the gases and for refilling with electrolyte.

The cells are filled with positive and negative grid plates, for example six positive and seven negative plates, with intervening separators of microporous material may be united in a plate stack and form the contents of one cell. All the current takeoffs (plate vanes) of the one and the other polarity are separately connected together by pole bridges which support the binding posts extending out of the block casing.

The grid plates best meet the desire to reduce the inactive structural elements and framework materials of a cell to the necessary minimum, relative to the electrode masses which alone are effective to deliver current, and thereby also increase the energy density. They may be very thin (1 mm); in that case the mass utilization is good even for high current intensities (starting of the vehicle). The electrodes, and with them the lead storage battery, owe their current high state of perfection to many recent efforts directed toward replacing the conventional lead/antimony grid alloys with antimony-poor or -free alloys, toward the storage capability of charged negative plates by means of oxidation protection, toward activating and self-discharge impeding additives of the most varied kinds, and toward still other improvements.

In contrast, the manufacturing process has in essence remained unchanged for decades, and has remained discontinuous despite a number of automated techniques. This is due initially to the individual manufacture of the grids in the grid casting machines, where they are generally produced as double grids and then have to be separated. The pasting machines also operate discontinuously. Likewise the tank forming, which follows the curing and is still widely used, constitutes a discontinuous work process in which the grid plates remain in the forming tank for many hours, hanging in frames and segregated in accordance with their intended polarity. Plate insertion into the block casing which, for cell- or block-casing forming, takes place after pasting or curing, again is done individually and discontinuously.

Accordingly, it is an object of the invention to provide a lead storage battery which is characterized by great economy, low maintenance requirements, and high reliability. It is a further object of the invention to provide a manufacturing process for this storage battery which makes possible predominantly continuous processing, and which meets the requirements of rational mass production better than heretofore.

These and other objects are achieved by making each plate stack of positive and negative strip electrodes, with intervening strip-shaped separator, which have been folded into a package with zig-zag configuration. The support frames for the active mass, and also the separators are in the form of continuous strips at the time the active mass is applied. Interruptions in these, as needed in the final battery, are made later. The folded zig-zag packages have their opposite edges adjacent the top and bottom of the battery casing, respectively.

Further details concerning the invention and the process embodying the invention are presented in what follows and in the accompanying single FIGURE of drawing.

This drawing schematically illustrates a two-cell storage battery block casing 1, lying on its side, with an electrode stack according to the invention, which consists of strip electrode 12, strip electrode 13, and the interposed separator strip 4 with ribs or lands 5. These are folded in zig-zag configuration into packages and, so packaged, are introduced into the storage battery cells from the side. The folds 6 of the electrode packages are perpendicular to the bottom surface of the storage battery, so that gas bubbles can rise unimpeded between the electrodes.

In accordance with the invention, both the connection of the cells to each other and also the external connection takes place by means of large-surface portion 9 of the electrode support frame of one of the strip electrodes, extending across the cell separating partition 7 or the outer wall 8, respectively, of the block casing. For example, in the drawing this extension over the outer wall 8 consists of the electrode support frame 2 of strip electrode 12.

The respective electrode strip may also be wrapped at its end over a lead rod (not shown), and may be connected thereto in electrically conductive manner, e.g. by pressure welding. Starting from this rod, a pole lead-through can then be provided in known manner.

The counter electrode and separator are interrupted in the connecting region between cells, as indicated by dotted lines in the drawing.

To manufacture a zig-zag folded electrode package according to the invention for a multi-cell storage battery, one preferably starts with electrode support frames 2, 3 which are wound as continuous strips upon spools 10, 11. They take the form of conventional lead support frames, or they may also consist of lead expanded metal. If desired, each electrode strip may have a land extending along its edge. Into these electrode support frames, a unitary mass is pasted as the active material. Thus, the electrode support frames 2, 3 are transformed into strip electrodes 12, 13. The segments of any given strip electrode (12 or 13) must alternate in polarity from cell to cell during battery operation. Accordingly, these segments are formed during manufacture so as to exhibit alternately positive and negative polarity.

With interposition of a separator strip 4, which is highly porous but largely insensitive to pressure, and which is unrolled from spool 14, the electrode strips are then brought together while passing over turnabout roller 15, after which they can be folded. The segments of strips 12 and 13 are so made that a positive segment of strip 12 is coextensive with a negative segment of strip 13 and vice-versa.

Just before the folding procedure, there are excized over predetermined distances those portions 9 from strip electrode 12 and separator 4 which would extend across the cell separating partition 7 after insertion in the block casing, and would therefore be superfluous. After the active mass has also been removed from this same portion of strip electrode 13, only the latter's support frame 3 remains as cell connector. Removal of the active mass can be accomplished by air blast, by rinsing, or, if desired, already during the pasting process by leaving an appropriate portion of the electrode frame free of pasted mass.

The same measures may, of course, be taken with respect to the strip portions which extend across the end walls 8 of the block casing after insertion, so that here, too, only the support frame 2 of strip electrode 12 remains to provide the external electrical connections 16, 17 beyond end walls 8.

To complete the storage battery, it then only remains to close the casing. Surprisingly, this can be done very simply by welding on a side wall 18, by means of the known mirror welding process. Due to the heating effect, the synthetic material of the cell separating partition 7 and of the end walls 8 of the casing, as well as of the mating extensions 19 and 20 in side wall 18, penetrates through the framework of the electrode, so that a strong and liquid-tight joint results. Before this mirror welding of a lid is performed, it may be desirable to urge the electrode frame against the separating partition by means of a ram and, if desired, to also provide additional heating during that process step in order to achieve a certain penetration of the electrode frame into the edge of cell separating partition 7 even before the ultimate mirror welding of the lid.

The necessary terminal post connections for such a storage battery may be formed inside or outside the cell from the protruding electrode frame portion, by pressing on and, if desired, welding on of a terminal post.

An advantage of the storage battery which has been described is that its manufacturing process exhibits a particularly desirable material flow. Rather than starting with separate pieces of mass-support material and of separator material, and interleaving these to form sandwich-like structures of two electrodes with intervening separator, the present invention utilizes as the starting materials continuous strips or bands of the mass-supports for both electrodes, as well as of the intervening separator. The active mass is then applied to the support bands as these run past the points of application, and the junction of the three components is again performed in an essentially continuous manner by bringing them together as they pass over turnabout roller 15.

In this way, prior "batch" processes are avoided and a more nearly continuous manufacturing operation is achieved. This is clearly highly preferable, both in terms of the cost of manufacture and the controllability and uniformity of the end product.

Another advantage is the positioning of the electrode package in the battery casing "on edge", i.e. with the opposite edges of the electrodes adjacent to the top and bottom of the casing and the connecting frame members passing through the sidewalls of the casing. This creates a structure in which gas evolving in the finished cell can freely rise to the top of the cell from any point. If the positioning were such that the opposite edges of the electrodes were adjacent the sidewalls of the casing, then gas evolving below a fold in the electrode package located at the top of the casing would be trapped beneath that fold and could not readily escape from the casing.

I claim:

1. A multicell lead storage battery comprising:
   a block casing divided into at least two cells by a cell separating partition;
   a plurality of electrode packages, one for each cell of the battery,
   wherein the electrode packages are comprised of two continuous strips of electrically conductive electrode supports and one continuous strip of separator material, each of the two continuous electrode strips being at least long enough to extend continuously through all the electrode packages of the battery, and are formed by applying a unitary active mass to each of the electrode supports, bringing the supports with the applied active mass together with the separator to produce a continuous three-layer structure of electrode-separator-electrode, and folding the three-layer structure into a plurality of zig-zag electrode packages, one for each cell of the battery, after removing the active mass from one of the two electrode strips and removing the active mass and the support from the other of the electrode strips along those portions of the structure which are to extend across the partition separating two adjacent cells when the electrode packages are inserted into the respective cells, the resulting active mass segments of any given electrode being formed to give alternate polarity to the electrode material in adjoining cells; and
   a closure for the block casing applied after the electrode packages have been inserted, said closure consisting of a sidewall of the battery.

2. A multicell lead storage battery having a plurality of cell areas defined by a separating partition positioned within a block casing, comprising
   a pair of parallel electrode strips and an interposed separator strip, each electrode strip comprising an electrode framework and an active mass applied thereto, said electrode strips being folded into a package in zig-zag configuration and inserted into the cell areas so that each cell area contains a portion of each of said pair of electrode strips,
   wherein, in each cell area, a first of said electrode strips is electrically connected on one side of the cell area only by the framework of said first electrode strip, from which the active mass has been removed, and the second electrode strip electrically connects the other side of said cell area with an adjacent cell area only by the framework of said second electrode strip, from which the active mass has also been removed, and
   wherein both the framework and the active mass of the first electrode strip is removed at the point of intercell connection so that the end pieces of the first electrode strip whose framework has been removed lie along the same face of the second electrode strip whose framework has not been removed on both sides of the intercell connection, consecutive portions of each of said first and second electrode strips comprising electrodes of alternating polarity in adjacent cells.

3. The battery of claim 1 wherein the external electrical battery connections are also provided by portions of said continuous three-layer structure from which everything except an electrode support has been removed and extending across the end walls of the block casing.

4. The battery of claim 3 wherein the electrode support portions extending across the end walls are connected in electrically conductive manner with rod-shaped lead members, the said rods providing the attachment for pole lead-throughs.

5. The battery of claim 3 wherein the electrode packages have their folded edges extending vertically within the cells.

6. The battery of claim 3 wherein the block casing including its closure sidewall and separating partition is made of synthetic material, and the closure of the block casing by its sidewall is accomplished by mirror welding across the cell separating partition and the block casing end walls, the synthetic material being softened by heating during closure, whereby said material penetrates the electrode support extending across the partition and end walls.

7. The battery of claim 6 wherein the electrode support is urged against the separating partition to produce some penetration of the support into said partition.

8. The battery of claim 2 wherein external electrically connections are provided by an electrode support framework of the same strip electrode extending through the end walls of the block casing.

9. The battery of claim 8 wherein the strip electrode packages have their folded edges extending vertically with the cells, and the block casing closure is provided by a side wall.

10. The battery of claim 2 wherein the electrode stacks are made of strip electrodes which are folded in zig-zag configuration and are inserted into a multicell block casing having a side opening, and said side opening of the block casing is closed in liquid-tight manner by welding a side wall.

* * * * *